United States Patent
Huff et al.

(10) Patent No.: US 9,809,178 B1
(45) Date of Patent: Nov. 7, 2017

(54) COMPRESSION LIMITER HAVING A DRAIN

(71) Applicant: Ford Global Technologies, LLC, Dearborn, MI (US)

(72) Inventors: Garret Sankey Huff, Ann Arbor, MI (US); Niamh Hosking, Plymouth, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 15/175,457

(22) Filed: Jun. 7, 2016

(51) Int. Cl.
*B60R 13/07* (2006.01)
*B60R 13/08* (2006.01)

(52) U.S. Cl.
CPC ............. *B60R 13/07* (2013.01); *B60R 13/08* (2013.01)

(58) Field of Classification Search
CPC . B60R 13/07; B60R 13/08; B60R 2013/0807; B62D 25/24
See application file for complete search history.

(56) References Cited

U.S. PATENT DOCUMENTS

| | | | | |
|---|---|---|---|---|
| 3,606,446 A | * | 9/1971 | Leslie | B60R 13/07 280/847 |
| 5,542,158 A | | 8/1996 | Gronau et al. | |
| 5,709,309 A | * | 1/1998 | Gallagher | B62D 25/24 137/849 |
| 6,768,058 B2 | | 7/2004 | Pallapothu | |
| 7,114,221 B2 | * | 10/2006 | Gibbons | F16B 5/065 24/289 |
| 7,814,624 B2 | | 10/2010 | Kitano | |
| 8,646,831 B2 | * | 2/2014 | Ohba | B60J 5/101 296/193.08 |
| 8,840,350 B2 | | 9/2014 | Inaba et al. | |
| 9,435,453 B1 | * | 9/2016 | Shen | F16K 15/147 |
| 2005/0241118 A1 | * | 11/2005 | Mizukoshi | B60R 13/08 24/297 |
| 2009/0177187 A1 | * | 7/2009 | Weaver Quigley | A61M 39/24 604/537 |
| 2014/0345091 A1 | | 11/2014 | Pierce et al. | |
| 2016/0052466 A1 | * | 2/2016 | Kuchibhatla | B60J 5/0468 296/146.11 |
| 2017/0114820 A1 | * | 4/2017 | Friedl | F16B 33/006 |

FOREIGN PATENT DOCUMENTS

CN 201981811 U 9/2011
JP 2005291278 10/2005

* cited by examiner

*Primary Examiner* — Gregory Blankenship
(74) *Attorney, Agent, or Firm* — Jason Rogers; Brooks Kushman P.C.

(57) ABSTRACT

A vehicle includes a body panel assembly including first and second panels. Each panel defines different materials, and the first and second panels are fastened at a joint using a fastener. A compression limiter is disposed at the joint and configured to reduce stress on the first and second panels due to the fastener. The compression limiter has a first ring to contact the first panel and a second ring to contact the second panel. The first ring defines a drain extending through the first ring to the second ring on an outer periphery of the first ring, and is oriented such that moisture between the first and second panels is wicked through the drain and removed from the panel assembly.

18 Claims, 2 Drawing Sheets

_US 9,809,178 B1_

COMPRESSION LIMITER HAVING A DRAIN

TECHNICAL FIELD

The present disclosure relates to press-fit compression limiters having a drain to reduce corrosion between two joined components.

BACKGROUND

Typical corrosion protection processes for similar-material joints may not provide adequate protection to mixed-material joints. For example, electrodeposited paint (e-coat) typically deposited to the assembled body-in-white, may be adequate for similar-material joints but may not provide enough protection to prevent corrosion of a mixed-material joint, where a significant electrochemical potential difference exists between the different materials. Other coatings and sealers may be implemented to mitigate galvanic corrosion effects, but such measures also add weight, cycle time and cost to the design, and may not be practical to apply in complex or recessed areas of the body structure.

SUMMARY

A body panel assembly for a vehicle includes a first body panel composed of a first material, a second body panel composed of a second material, different from and joined to the first material, and a compression limiter. The compression limiter is configured to reduce joining stress on the first and second panels, and disposed between the first and second panels, the compression limiter has a first ring configured to contact the first panel to define a drain through the compression limiter. The drain is disposed on an outer periphery of the first ring and oriented such that moisture is drained from an interface of the first and second panels.

A vehicle includes a body panel assembly including first and second panels. Each panel defines different materials, and the first and second panels are fastened at a joint using a fastener. A compression limiter is disposed at the joint and configured to reduce stress on the first and second panels due to the fastener. The compression limiter has a first ring to contact the first panel and a second ring to contact the second panel. The first ring defines a drain extending through the first ring to the second ring on an outer periphery of the first ring, and is oriented such that moisture between the first and second panels is wicked through the drain and removed from the panel assembly.

A compression limiter for a vehicle body panel assembly includes a first ring to contact a first panel, a second ring to contact a second panel, and connected to the first ring by a sleeve; and a drain defined on the first ring. The drain is configured to provide a fluid passageway through the sleeve, and oriented such that moisture is wicked from between the first and second panels.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
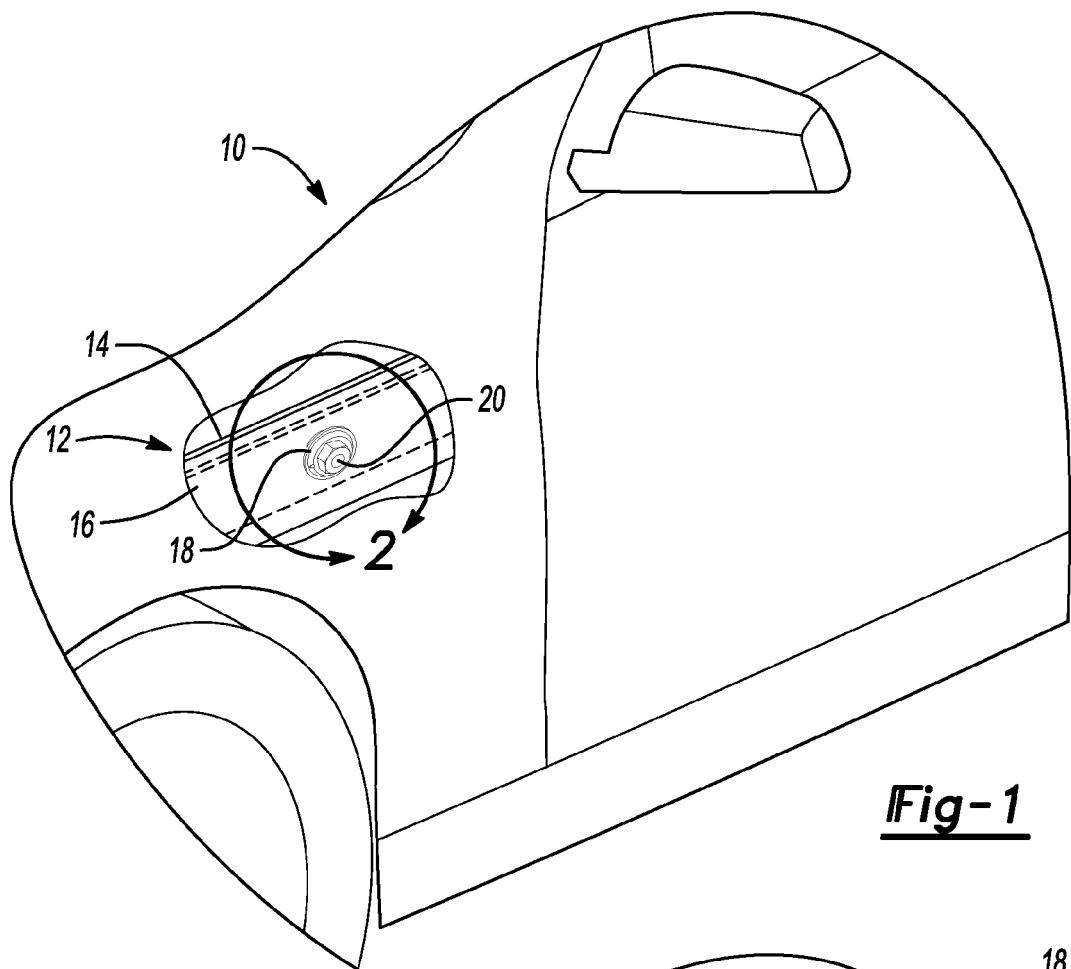
FIG. 1 is a perspective of a body panel assembly for a vehicle having a compression limiter.

FIG. 1 depicts a vehicle 10 having a body panel assembly 12. The body panel assembly 12 includes a first panel 14 and a second panel 16 as well as a compression limiter 18. The first and second panels 14, 16 may be fastened together using a fastener 20. The fastener 20 imparts stress on the body panel assembly 12 when the first panel 14 and the second panel 16 are joined. The compression limiter 18 aids to keep the compression force on the first panel 14 below a maximum threshold by directing excess force into the second panel 16 to avoid damage to the body panel assembly 12. As will be described in more detail below, the compression limiter 18 may also aid in preventing deterioration of the body panel assembly 12 due to corrosion between the first panel 14, the second panel 16, and the fastener 20.

The first panel 14 may be made from a first material and the second panel 16 may be made from a second material. Using a multi-material construction for the body panel assembly 12 may improve structural rigidity as well as reduce weight of the vehicle 10. However, corrosion due to galvanic reaction between the first panel 14 and the second panel 16 may result from introduction of electrolyte between the first panel 14 and the second panel 16 during normal operational use. For certain multi-material joints, a coating process alone, such as e-coat, may not provide sufficient protection from corrosion within the body panel assembly 12. The compression limiter 18 may also be configured to allow drainage of an electrolyte from between the first panel 14 in the second panel 16 within the body panel assembly 12 such that the galvanic coupling between the first panel 14 in the second panel 16 is not made.

For example, the first panel 14 may be composed of steel and the second panel 16 may be composed of aluminum. When fastened together such that contact is made between the first panel 14 and the second panel 16, a galvanic potential is present within the body panel assembly 12. The galvanic potential in the body panel assembly 12 results in galvanic corrosion when an electrolyte is introduced between the first panel 14 and the second panel 16. The electrolyte may be introduced in the body panel assembly 12 when moisture, such as water, seeps into an unsealed fastened joint such as between the first panel 14 and the second panel 16. The compression limiter 18 may be configured to reduce stress due to the fastener 20 as well as to remove moisture from between the first panel 14 and the second panel 16 to prevent galvanic corrosion.

The compression limiter 18 may be configured to drain moisture from between the first panel 14 and the second panel 16. Draining moisture from between the body panel assembly 12 allows the compression limiter 18 to further reduce stress from the joint of the body panel assembly 12 and further aid to prevent galvanic corrosion from the body panel assembly 12. The compression limiter 18 further aids to provide a multi-material joint for a vehicle body panel assembly 12. As stated above, using a multi-material joint on the body panel assembly 12 may further provide added structural rigidity to the vehicle 10 while reducing the overall weight of the vehicle 10. While the body panel assembly 12 is described as using aluminum and steel, any other multi-material constructions resulting in a galvanic potential between the materials may also be used for the first panel 14 and the second panel 16.

Figure 2:
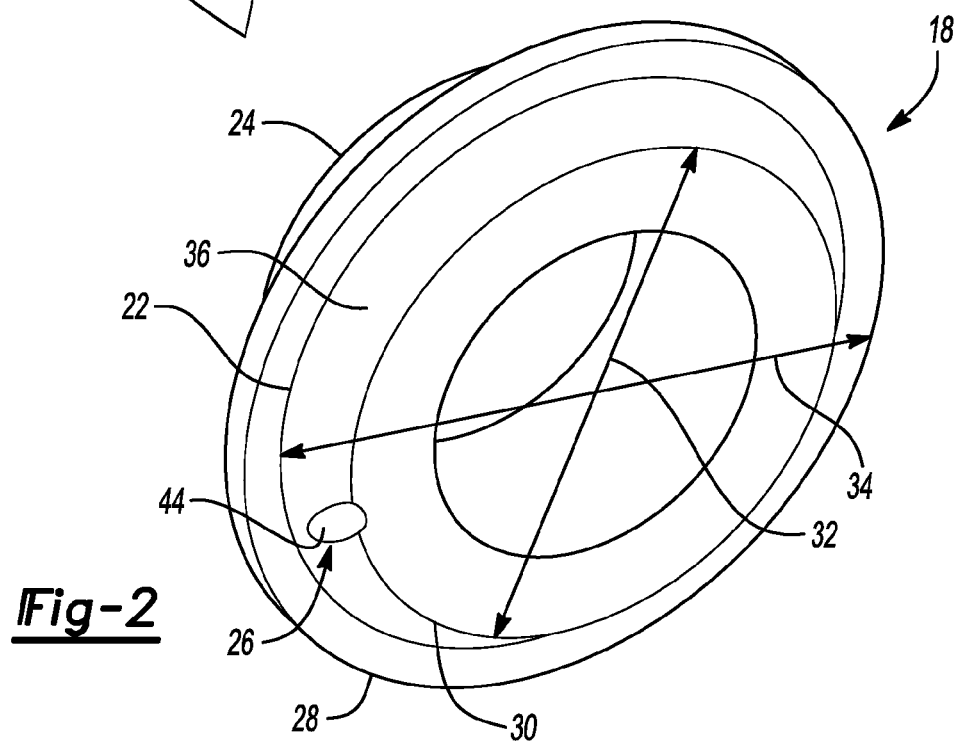
FIG. 2 is a perspective view of a compression limiter having a drain defined on an outer periphery of a first ring.

Referring to FIG. 2, a perspective view of the compression limiter 18 is shown. The compression limiter 18 includes a first ring 22 and a second ring 24. The first ring 22 is configured to contact the first panel 14 and the second ring 24 is configured to contact the second panel 16. As stated above, the compression limiter 18 may also be configured to wick moisture from between the body panel assembly 12. The compression limiter 18 further includes a drain 26. The drain 26 may be defined on the first ring 22. More specifically, the drain 26 may be defined on an outer periphery 28 of the first ring 22. The drain 26 allows the compression limiter 18 to wick or remove moisture from between the first panel 14 and the second panel 16. For example, when moisture is trapped between the first panel 14 and the second panel 16, the drain 26 provides an outlet 44 to release the moisture from the body panel assembly 12.

As will be described in more detail below, fluid moves through the drain 26 to prevent galvanic corrosion between the first panel 14 and the second panel 16. Therefore, the drain 26 is configured to eliminate an electrolyte between the first panel 14 and the second panel 16, which may have a galvanic potential as described above. The drain 26 allows the compression limiter 18 to further prevent galvanic corrosion in the body panel assembly 12 and allow for a multi-material construction of the body panel assembly 12. Orientation of the drain 26 further allows the compression limiter 18 to wick moisture from between the first panel 14 and the second panel 16. For example, one method to wick moisture from the body panel assembly is to orient the drain 26 such that moisture moves through the drain 26 due to gravity.

In at least one embodiment, the compression limiter 18 may be oriented such that the first ring 22 may be disposed in a downward manner. The drain 26, defined on an outer periphery 28 of the first ring 22, may then be oriented such that moisture is pulled through the drain 26 using the gravitational force. Using gravity to pull moisture through the drain 26 allows the compression limiter 18 to wick moisture from between the first panel 14 and the second panel 16 without any further adaptation to the compression limiter 18. In at least one other embodiment, the drain 26 may be formed on the first ring 22 and extends through the compression limiter 18 to the second ring 24 such that moisture freely moves through the compression limiter 18 to exit from the drain 26. This may include forming the drain with an angle relative to the first and second rings 22, 24. Therefore, the compression limiter 18 may be used to wick moisture from the body panel assembly 12 using gravity when the compression limiter 18 is substantially horizontal.

As can be seen in FIG. 2, the compression limiter 18 may further include a ledge 30. The ledge 30 may be formed on the first ring 22. The ledge 30 may be formed at an angle relative to the first ring 22 and define a diameter 32 smaller than a diameter 34 of the first ring 22. The ledge 30 may aid in facilitating the drain 26 to wick moisture from the body panel assembly 12. For example, the ledge 30 may be formed at a distance from the first ring 22 via a ramp 36. The ramp 36 increases and amount of material used to form the first ring 22. The drain 26 may also be formed on the ledge 30. Forming the drain 26 on the ledge 30 allows the compression limiter 18 to maintain structural rigidity and decrease the stress induced on the body panel assembly 12 due to fastening. The ledge 30 allows for inclusion of the drain 26 on the compression limiter 18 without compromising the integrity of the compression limiter 18.

Likewise, the drain 26 may be formed on the ramp 36. Again, forming the drain 26 on the ramp 36 allows the compression limiter 18 to wick moisture without compromising the integrity of the compression limiter 18. Further, the ramp 36 may aid in allowing the drain 26 to wick moisture from the body panel assembly 12 using gravity. The ramp 36 may aid in angling the drain 26 relative to the first ring 22 and overall orientation of the compression under 18. As stated above, angling the drain 26 relative to the first ring 22 and compression limiter 18 allows gravity to pull moisture through the drain 26 from the body panel assembly 12.

Figure 3:
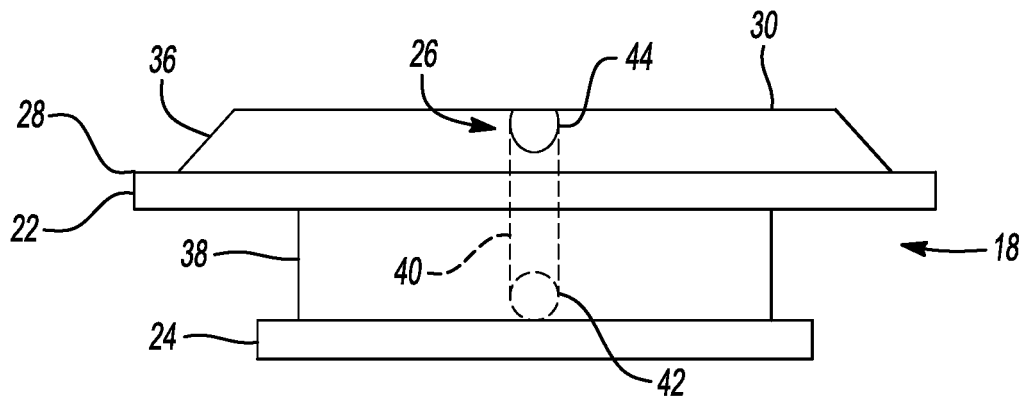
FIG. 3 is a side view of a compression limiter joining two body panels of dissimilar metals.

FIG. 3 depicts a side view of the compression limiter 18 having the drain 26 defined on the ramp 36. As can be seen in FIG. 3, the compression limiter 18 further includes a sleeve 38 interconnecting the first ring 22 in the second ring 24. The drain 26 also defines a fluid passageway 40. In one embodiment, the fluid passageway 40 extends from the sleeve 38 to the ramp 36. However, as stated above, the fluid passageway 40 may also extend from the sleeve 38 to the outer periphery 28 of the first ring 22. Likewise, in other embodiments the fluid passageway 40 may extend from the second ring 24 to the first ring 22, or the ledge 30. The drain 26 may also define an inlet 42 and the outlet 44.

The fluid passageway 40 of the drain 26 extends from the inlet 42 to the outlet 44. The inlet 42 may be defined on the sleeve 38 and the outlet may be defined on the first ring 22, as stated and described above. Moisture flows through the fluid passageway 40 from the inlet 42 through the outlet 44 to define the drain 26. In at least one embodiment, the inlet 42 may be defined on the sleeve 38. Defining the inlet 42 on the sleeve 38 allows the drain 26 to wick moisture between the body panel assembly 12. For example, the drain 26 via the fluid passageway 40 allows the moisture to escape the body panel assembly 12 and drain into the atmosphere. As stated above, this may be done using gravity.

The inlet 42 may be defined at various points on the sleeve 38. The inlet 42 may be optimized based upon the thickness of the first panel 14 and the second panel 16. For example, if the first panel 14 is thicker than the second panel 16, the inlet 42 of the drain 26 may be defined on the sleeve 38 closer to the second ring 24. Likewise, if the first panel 14 is thinner than the second panel 16, the inlet 42 of the drain 26 may be defined on the sleeve 38 closer to the first ring 22. In at least one other embodiment, the inlet 42 of the drain 26 may also be defined on the second ring 24. Defining the inlet 42 of the drain 26 on the second ring 24, or anywhere on the sleeve 38 allows the compression limiter 18 to wick moisture from the body panel assembly 12 in a variety of differing uses based upon vehicle size, vehicle type, panel size, panel type, or any other vehicle design in which moisture may accumulate between body panel assemblies 12 that require a compression limiter 18.

Figure 4:
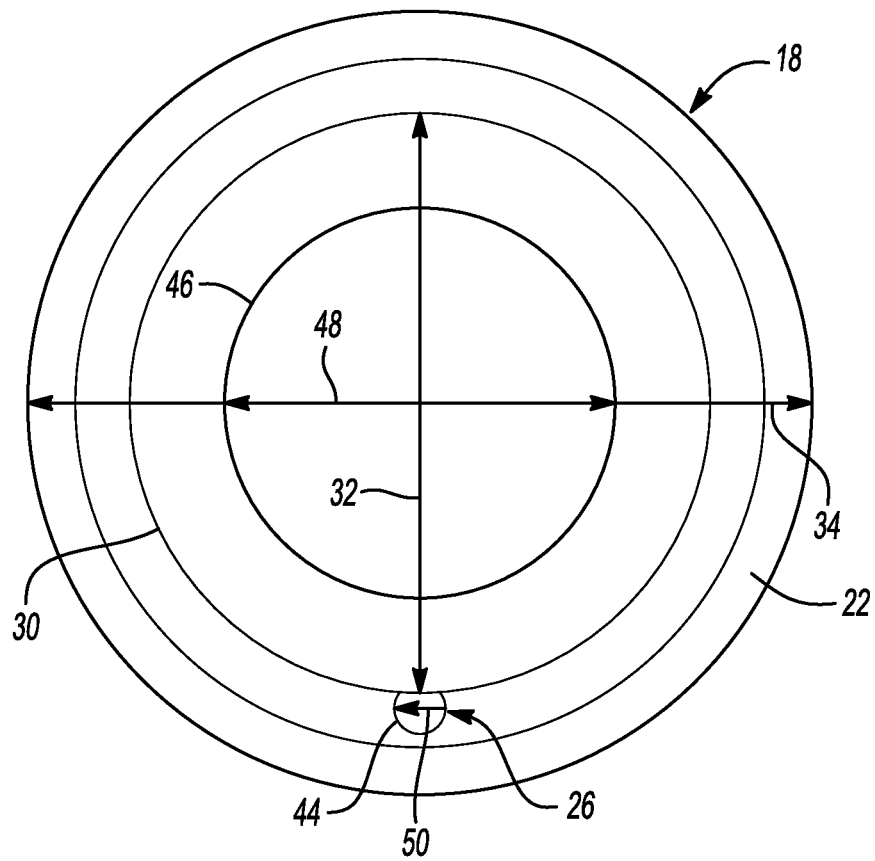
FIG. 4 is a top view of a compression limiter joining two body panels of dissimilar metals.

FIG. 4 depicts a top view of the compression limiter 18 showing the outlet 44 defined on the ramp 36. As can be seen in the view of FIG. 4, the compression limiter may also define a central bore 46. The central bore 46 defines a diameter 48 less than the diameter 32 of the ledge 30. As stated above, the diameter 32 of the ledge 30 is less than the diameter 34 of the first ring 22. The difference between the diameter 48 of the bore 46 and the diameter 32 of the ledge 30 allows the drain 26 to be defined on the ledge 30. Likewise, the difference between the diameter 48 of the bore 46 and the diameter 34 of the first ring 22 allows the drain to be defined on the first ring 22. The differences between the central bore 46, the first ring 22, and the ledge 30 define the dimensions of the drain 26.

The outlet 44 of the drain 26 defines a diameter 50 such that moisture, such as water or any other liquid having an electrolyte, can escape through the compression limiter 18 freely. The diameter 50 of the outlet 44 is consistent through the drain 26, including the fluid passageway 40 and the inlet 42. For example, the diameter 50 is defined such that as moisture flows through the drain 26 to allow the moisture to escape from the outlet 44. Therefore, the difference between the diameter 48 of the bore 46 and the diameters 32, 34 of the ledge 30 and the first ring 22 may be such that the diameter 50 of the drain 26 can extend through the compression limiter 18, as stated above, and allow moisture to flow freely through the drain 26 to escape the compression limiter 18.

The drain 26 is depicted in FIG. 4 as being circular in shape. In at least one other embodiment, the drain 26 may also define an elliptical shape. Further, the drain 26 may be formed as a slot and extend from the ledge 30 across the ramp 36 to the outer periphery 28 of the first ring 22. Likewise, the drain 26 may be formed partially on the ledge 30 and the ramp 36, or on the ramp 36 and the first ring 22. As stated above, the drain 26 may also be formed solely on the ledge 30, the ramp 36, or the first ring 22. The size, shape and location of the drain 26 may vary depending on vehicle size, vehicle type, panel material, and panel size in order to effectively remove moisture from between a body panel assembly 12 and eliminate an electrolyte that may result in galvanic corrosion of the vehicle body panel assembly 12. Optimization of the drain 26 allows the compression limiter 18 to further reduce or eliminate galvanic corrosion as a result of a multi-material joint to improve structural rigidity and fuel efficiency of the vehicle.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A body panel assembly for a vehicle comprising:
   a first body panel composed of a first material;
   a second body panel composed of a second material, different from and joined to the first material; and
   a compression limiter configured to reduce joining stress on the first and second panels, and disposed between the first and second panels, the compression limiter having a first ring configured to contact the first panel defining a drain through the compression limiter, and the drain disposed on an outer periphery of the first ring oriented such that moisture is drained from an interface of the first and second panels.

2. The body panel assembly of claim 1, wherein the compression limiter further includes a second ring configured to contact the second panel and connected to the first ring via a sleeve such that the drain provides a fluid passageway through the second ring and sleeve.

3. The body panel assembly of claim 1, wherein the drain defines a circular shape.

4. The body panel assembly of claim 1, wherein the drain defines a slot.

5. The body panel assembly of claim 1, wherein the compression limiter further defines a central bore configured to receive a fastener to join the first and second body panels.

6. The body panel assembly of claim 1, wherein the drain is oriented such that gravitational force pulls moisture through the drain.

7. A vehicle comprising:
   a body panel assembly including first and second panels, each panel defining different materials, and the first and second panels being fastened at a joint using a fastener; and
   a compression limiter disposed at the joint and configured to reduce stress on the first and second panels due to the fastener, the compression limiter having a first ring to contact the first panel and a second ring to contact the second panel, and the first ring defining a drain extending through the first ring to the second ring on an outer periphery of the first ring, and oriented such that moisture between the first and second panels is wicked through the drain and removed from the panel assembly.

8. The vehicle of claim 7, wherein the first ring and the second ring are connected via a sleeve such that the drain defines a fluid passageway through the sleeve from the second ring to the first ring.

9. The vehicle of claim 8, wherein the fastener extends through a central bore defined through the first ring, the second ring, and the sleeve.

10. The vehicle of claim 8, wherein the drain defines a circular shape.

11. The vehicle of claim 10, wherein the drain defines a diameter such that the fluid passageway overcomes capillary forces of the moisture.

12. The vehicle of claim 7, wherein the drain defines an elliptical shape.

13. A vehicle body panel assembly compression limiter comprising:
   a first ring to contact a first panel;
   a second ring to contact a second panel, and connected to the first ring by a sleeve, wherein first and second rings are disposed between and reduce stress on the panels; and a drain having an elliptical shape defined on the first ring to provide a fluid passageway through the sleeve, and oriented to wick moisture from between the panels.

14. The compression limiter of claim 13, wherein the drain is defined on an outer periphery of the first ring.

15. The compression limiter of claim 14, wherein the drain defines a slot on the outer periphery of the first ring.

16. The compression limiter of claim 13, wherein the drain is disposed on a ledge formed on the first ring.

17. The compression limiter of claim 13, wherein the drain is disposed on a ramp interconnecting the first ring and a ledge formed on the first ring.

18. The compression limiter of claim 13, wherein the drain defines a circular shape.

\* \* \* \* \*